(12) United States Patent
Whitehouse et al.

(10) Patent No.: US 10,693,388 B2
(45) Date of Patent: Jun. 23, 2020

(54) POWER CONVERTER

(71) Applicant: General Electric Technology GmbH, Baden (CH)

(72) Inventors: Robert Stephen Whitehouse, Stafford (GB); Carl David Barker, Staffordshire (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/916,543

(22) PCT Filed: Jul. 24, 2014

(86) PCT No.: PCT/EP2014/065981
§ 371 (c)(1),
(2) Date: Mar. 3, 2016

(87) PCT Pub. No.: WO2015/032547
PCT Pub. Date: Mar. 12, 2015

(65) Prior Publication Data
US 2016/0197558 A1 Jul. 7, 2016

(30) Foreign Application Priority Data

Sep. 4, 2013 (EP) ..................................... 13275200

(51) Int. Cl.
*H02M 5/458* (2006.01)
*H02M 7/483* (2007.01)
*H02J 3/36* (2006.01)

(52) U.S. Cl.
CPC .......... *H02M 5/458* (2013.01); *H02M 7/483* (2013.01); *H02J 2003/365* (2013.01); *H02M 2007/4835* (2013.01); *Y02E 60/60* (2013.01)

(58) Field of Classification Search
CPC .................................................. H02M 5/458
(Continued)

(56) References Cited

U.S. PATENT DOCUMENTS

2008/0252142 A1  10/2008  Davies et al.
2010/0067266 A1*  3/2010  Dommaschk ......... H02M 7/483
                                                   363/64
(Continued)

FOREIGN PATENT DOCUMENTS

CN  103051267 A  4/2013
CN  103119818 A  5/2013
(Continued)

OTHER PUBLICATIONS

International Search Report and Written Opinion, PCT Application No. PCT/EP2014/065981, Alstom Technology Ltd, 11 pages (dated Sep. 19, 2014).
Adam, G.P. et al., "Multi-terminal DC transmission system based on modular multilevel converter," Universities Power Engineering Conference (UPEC), 2009 Proceedings of the 44th International IEEE, pp. 1-5 (Sep. 1, 2009).
(Continued)

*Primary Examiner* — Jue Zhang
*Assistant Examiner* — Trinh Q Dang
(74) *Attorney, Agent, or Firm* — Eversheds Sutherland US (LLP)

(57) ABSTRACT

A modular power converter includes first and second terminals to connect to electrical networks and at least one module connected between the first and second terminals, the module(s) including at least one switching element and at least one energy storage device, the switching element(s) and the energy storage device(s) combining to selectively provide a voltage source, the switching element(s) being switchable to transfer power between the first and second terminals. The converter further includes a control unit configured to selectively control switching of the switching element(s) to store energy from or release energy to either or both of the first and second terminals so as to decouple respective power flows at the first and second terminals and thereby inhibit a modulation of power flow at one of the first and second terminals from modifying a power flow at the other of the first and second terminals.

15 Claims, 3 Drawing Sheets

(58) Field of Classification Search
USPC .......................................................... 363/35
See application file for complete search history.

(56) References Cited

U.S. PATENT DOCUMENTS

| | | | |
|---|---|---|---|
| 2011/0194323 A1 | 8/2011 | Winkeinkemper et al. | |
| 2012/0212984 A1* | 8/2012 | Yamada | H02M 7/219 363/89 |
| 2013/0336024 A1* | 12/2013 | Permuy | H02M 5/44 363/37 |
| 2014/0016379 A1* | 1/2014 | Yamamoto | H02M 5/44 363/37 |

FOREIGN PATENT DOCUMENTS

| | | |
|---|---|---|
| WO | WO 2007/028350 A1 | 3/2007 |
| WO | WO 2012/136252 A1 | 10/2012 |

OTHER PUBLICATIONS

Ahmed, N. et al., "HVDC SuperGrids with modular multilevel converters: the power transmission backbone of the future," 2012 9$^{th}$ International Multi-Conference on Systems, Signals and Devices (SSD 2012), pp. 1-7 (Mar. 20-23, 2012).

Knudsen, L. et al., Description and prospective applications of new multi-terminal HVDC system concepts, CIGRE, No. 14-201, Paris, France, Aug. 26, 1990-Sep. 1, 1990 (11 pages).

English-language machine translation of CN 103051267-A, Hubei Electric Power Co. (Apr. 17, 2013).

Li, W. et al., "Control and Performance of a Modular Multilevel Converter System," CIGRE Canada—Conference on Power Systems, Halifax, Nova Scotia, 8 pages (Sep. 6-8, 2011).

Machine Translation and First Office Action and Search issued in connection with corresponding CN Application No. 2014800601266 dated Oct. 23, 2017.

* cited by examiner

POWER CONVERTER

CROSS-REFERENCE TO RELATED APPLICATIONS

The present application is a National Stage of International Application No. PCT/EP2014/065981, filed Jul. 24, 2014, which claims the benefit of and priority to European Application No. 13275200, filed Sep. 4, 2013, which is incorporated herein by reference in its entirety.

This invention relates to a modular power converter.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC networks operating at different frequencies. In any such electrical assembly, converters are required at each interface between AC and DC power to effect the required conversion, and one such form of converter is a power converter.

According to a first aspect of the invention, there is provided a modular power converter comprising:

a first terminal for connection to a first electrical network;
a second terminal for connection to a second electrical network;
at least one module connected between the first and second terminals, the or each module including at least one switching element and at least one energy storage device, the or each switching element and the or each energy storage device in the or each module combining to selectively provide a voltage source, the or each switching element in the or each module being switchable to transfer power between the first and second terminals; and
a control unit being configured to selectively control switching of the or each switching element in the or each module to store energy from or release energy to either or both of the first and second terminals so as to decouple respective power flows at the first and second terminals and thereby inhibit a modulation of power flow at one of the first and second terminals from modifying a power flow at the other of the first and second terminals.

For the purposes of this specification, the use of the term "modular" with respect to the power converter according to the invention is intended to refer to the inclusion of at least one module in the power converter according to the invention.

It will be understood that each of the first and second electrical networks may be an AC or DC electrical network. Accordingly the modular power converter may be a AC-AC, AC-DC or DC-DC modular power converter.

The inclusion of the control unit in the modular power converter enables control of the or each module to momentarily store energy from or release energy to either or both of the first and second terminals so as to decouple the respective power flows at the first and second terminals (and therefore in the first and second electrical networks). Therefore, when modulation of power flow at one of the first and second terminals (and therefore modulation of power flow in one of the first and second electrical networks) is being carried out, the decoupling of the respective power flows at the first and second terminals inhibits the modulation of power flow from modifying a power flow in the other of the first and second terminals (and therefore in the other of the first and second electrical networks). This thereby prevents any undesirable change in power flow in the other of the first and second electrical networks that would have otherwise resulted from the modulation of power flow.

In practice, the or each module may be designed to utilise less than its maximum energy storage capacity during its control to enable the modular power converter to transfer power between the first and second terminals (and therefore between the first and second electrical networks). This means that any unused energy storage capacity of the or each module is available for temporary energy storage during the operation of the modular power converter to decouple the respective power flows at the first and second terminals.

In addition, the functions of transferring power between the first and second terminals and enabling decoupling of the respective power flows at the first and second terminals both involve switching of the or each switching element in the or each module.

Accordingly there is not only no need to modify the or each module to enable the modular power converter to carry out both functions, but also such switching of the or each switching element in the or each module to carry out both functions may be implemented within the same control unit, without requiring a significant addition of control hardware to accommodate both functions.

In contrast, omission of the control unit from the modular power converter means that it would be necessary to utilise a bulk energy storage system, which is separate from the modular power converter, to isolate an electrical network from the effects of modulation of power flow. Use of a bulk energy storage system would not only add size, weight and cost to the associated electrical network, but also would have a number of other issues such as in-service operating losses, maintenance and reliability and availability considerations, thus resulting in a less efficient and less reliable alternative.

The configuration of the modular power converter according to the invention therefore results in a cost-efficient and space-saving modular power converter that is not only capable of transferring power between the first and second terminals but also capable of selectively enabling decoupling of the respective power flows in the first and second terminals so as to inhibit a modulation of power flow at one of the first and second terminals from modifying a power flow at the other of the first and second terminals.

Modulation of power flow at one of the first and second terminals may be carried out for various purposes, such as optimising power flow quality.

In embodiments of the invention, modulation of a power flow at one of the first and second terminals may include damping of at least one power oscillation. Such damping may be achieved by modulating a magnitude, frequency and/or phase of power flow at one of the first and second terminals.

A power system is built out of a variety of power system components, such as generators, transmission lines and loads. Hence, there are many possible modes of interaction between the various power system components. Normally the power system is designed to be damped at a particular frequency of a given interaction between power system components. However, under certain circumstances, an interaction between power system components may not be damped, thus resulting in build-up of a power oscillation in the power system. A power oscillation is an exchange in real power between active power system components of the power system.

The frequency of the power oscillation depends upon the mode of interaction. For interaction between individual generators or between groups of generators (i.e. sub-synchronous oscillations), the frequency of the power oscillation is typically in the region of 1-2 Hz. For interactions between large areas of the power system (i.e. inter-area oscillations), the frequency of the power oscillation is typically in the region of 0.1 Hz.

The ability of the modular power converter to decouple the respective power flows in the first and second terminals, as described above, enables any modulation of power flow to damp at least one power oscillation in one of the first and second electrical networks to be inhibited from modifying a power flow in the other of the first and second electrical networks.

The aforementioned ability of the modular power converter may be useful when, for example, the first electrical network connected to the modular power converter includes a relatively small, weak, low inertia AC power system (e.g. a wind farm). In the absence of decoupling of the respective power flows of the first and second electrical networks, any modulation of power flow in the second electrical network would translate directly to a modulation of power flow in the weak, low inertia AC power system. In the case of the weak, low inertia AC power system being a wind farm, any modulation of power flow in the second electrical network would translate directly to a power modulation of wind turbines at frequencies that may have undesirable effects on associated generators and mechanical structures. Current wind turbines cannot easily absorb power fluctuations without dissipating energy in damping resistors which results in energy losses, or without constantly changing their blade pitch which results in mechanical wear and stress on a tower supporting the wind turbine(s).

The aforementioned ability of the modular power converter may also be useful when, for example, the modular power converter is an AC-DC modular power converter, and modulation of power flow is required to damp power oscillations within a weak, offshore AC power system connected to the modular power converter. In the absence of decoupling of the respective power flows of the first and second electrical networks, such modulation of power flow at the AC side of the modular power converter would result in modulation of power flow at the DC side of the modular power converter with possible undesirable consequences.

In further embodiments of the invention, the control unit may be configured to selectively control switching of the or each switching element in the or each module to carry out modulation of power flow at one of the first and second terminals. Configuring the control unit in this manner provides the modular power converter with the ability to carry out modulation of power flow at one of the first and second terminals, thus minimising or obviating the need for additional power flow modulating hardware.

In such embodiments, the control unit may be configured to selectively control switching of the or each switching element in the or each module to concurrently:
  carry out modulation of power flow at one of the first and second terminals; and
  store energy from or release energy to either or both of the first and second terminals so as to decouple respective power flows at the first and second terminals and thereby inhibit the modulation of power flow from modifying a power flow at the other of the first and second terminals.

The ability to concurrently carry out modulation of power flow at one of the first and second terminals and decouple the respective power flows at the first and second terminals enables synchronisation of the modulation of power flow at one of the first and second terminals and the decoupling of the respective power flows at the first and second terminals.

The modular power converter according to the invention may come in a variety of configurations depending on the requirements of the associated power application. For example, in embodiments of the invention, the modular power converter may include:
  a pair of DC terminals connectable to a DC electrical network;
  at least one converter limb extending between the pair of DC terminals and including first and second limb portions separated by an AC terminal, the AC terminal being connectable to an AC electrical network, each limb portion including at least one module, the or each switching element in each module being switchable to control the configuration of an AC voltage at the AC terminal and thereby transfer power between the AC and DC electrical networks,
  wherein the DC terminals define first terminals and the AC terminal defines the second terminal, or the DC terminals defines second terminals and the AC terminal define a first terminal.

The number of converter limbs in such a modular power converter may vary from depending on the number of phases in the AC electrical network to which the modular power converter is connected.

The or each energy storage device may be, but is not limited to, a capacitor, a supercapacitor, an ultracapacitor, a battery or a fuel cell. It is envisaged that at least one module may include a combination of different energy storage devices, such as the aforementioned types.

The modular arrangement of the modular power converter makes it straightforward to use different types or combinations of energy storage devices to vary the energy storage capacity of at least one module to meet specific power requirements. For example, in embodiments of the invention in which the control unit is configured to selectively control switching of the or each switching element in the or each module to carry out modulation of power flow at one of the first and second terminals, the or each energy storage device may be selected to increase the range at which the modular power converter is able to carry out modulation of power flow at one of the first and second terminals The modular power converter may form part of an electrical assembly that includes a plurality of power converters.

According to a second aspect of the invention, there is provided an electrical assembly comprising:
  a first power converter including a first terminal and a second terminal, one of the first and second terminals of the first power converter being connectable to a first electrical network;
  a second power converter including a first terminal and a second terminal, one of the first and second terminals of the second power converter being connectable to a second electrical network; and
  a transmission link to operatively interconnect the other of the first and second terminals of the first power converter and the other of the first and second terminals of the second power converter;

wherein at least one of the first and second power converters is a modular power converter according to any embodiment of the first aspect of the invention.

Modulation of power flow in the first or second electrical network or the transmission link connected to one of the first and second terminals of the or each modular power converter may be inhibited by the or each modular power converter from modifying a power flow at the other of the corresponding first and second terminals, thus minimising any undesirable effect on power flows to, from or within the electrical assembly resulting from the modulation of power flow.

Configuring each of multiple power converters as a modular power converter results in a higher, combined energy storage capacity that allows a combined operation of the multiple power converters to decouple the respective power flows of the electrical networks over a wider range of modulation of power flow in comparison to the range of modulation of power flow over which each power converter is individually capable of decoupling the respective power flows at the corresponding first and second terminals.

When one of the first and second power converters is a modular power converter according to any embodiment of the first aspect of the invention, the other power converter may include a control unit configured to selectively operate that power converter to carry out modulation of power flow at one of the corresponding first and second terminals.

The control unit of the modular power converter may be configured to selectively control switching of the or each switching element in the or each corresponding module to store energy from or release energy to either or both of the corresponding first and second terminals so as to decouple respective power flows at the corresponding first and second terminals and thereby inhibit a modulation of power flow at one of the corresponding first and second terminals from modifying a power flow at the other of the corresponding first and second terminals when the other power converter is operated to carry out modulation of power flow at one of the corresponding first and second terminals. Such coordination between the modular power converter and the other power converter ensures that the modulation of power flow at one of the first and second terminals of the other power converter is reliably inhibited from modifying a power flow at the modular power converter's terminal that is not connected to the other power converter.

The electrical assembly may include a plurality of power converters and a plurality of transmission links. One of the first and second terminals of each power converter may be connectable to a respective electrical network. The other of the first and second terminals of each power converter may be connected to the other of the first and second terminals of at least one other power converter via a respective one of the plurality of transmission links. At least one of the plurality of power converters may be a modular power converter according to any embodiment of the first aspect of the invention.

Such an electrical assembly may be or form part of, for example, an AC or DC power grid.

As mentioned earlier, configuring each of multiple power converters as a modular power converter results in a higher, combined energy storage capacity that enables a combined operation of the multiple power converters to decouple the respective power flows of the electrical networks over a wider range of modulation of power flow in comparison to the range of modulation of power flow over which each power converter is individually capable of decoupling the respective power flows at the corresponding first and second terminals.

The or each modular power converter in the electrical assembly may be arranged with respect to the other power converters such that the or each modular power converter may be selectively operated to decouple the respective power flows at the corresponding first and second terminals so as to inhibit a modulation of power flow in one or more sections of the electrical assembly or in one or more of the electrical networks from modifying a power flow in one or more other sections of the electrical assembly or in one or more of the other electrical networks.

The inclusion of the or each modular power converter in the electrical assembly therefore makes it more straightforward to regulate power flow in the electrical assembly in response to a modulation of power flow, especially when the electrical assembly includes a complex interconnection of components that results in a complicated layout of power flows within the electrical assembly.

Each power converter of the electrical assembly may be a modular power converter according to the invention. Configuring the electrical assembly in this manner further enhances its ability to regulate power flows therein.

When at least one of the plurality of power converters is a modular power converter according to any embodiment of the first aspect of the invention, at least one other power converter may include a control unit configured to selectively operate that other power converter to carry out modulation of power flow at one of the corresponding first and second terminals.

The control unit of the or each modular power converter may be configured to selectively control switching of the or each switching element in the or each corresponding module to store energy from or release energy to either or both of the corresponding first and second terminals so as to decouple respective power flows at the corresponding first and second terminals and thereby inhibit a modulation of power flow at one of the corresponding first and second terminals from modifying a power flow at the other of the corresponding first and second terminals when the or each other power converter is operated to carry out modulation of power flow at one of the corresponding first and second terminals. Such coordination between the or each modular power converter and the or each other power converter ensures that the modulation of power flow at one of the first and second terminals of the or each other power converter is reliably inhibited from modifying a power flow at the or each modular power converter's terminal that is not connected to the other power converter.

In embodiments of the electrical assembly according to the invention, modulation of a power flow at one of the first and second terminals may include damping of at least one power oscillation.

Preferred embodiments of the invention will now be described, by way of non-limiting examples, with reference to the accompanying drawings in which.

Figure 1:
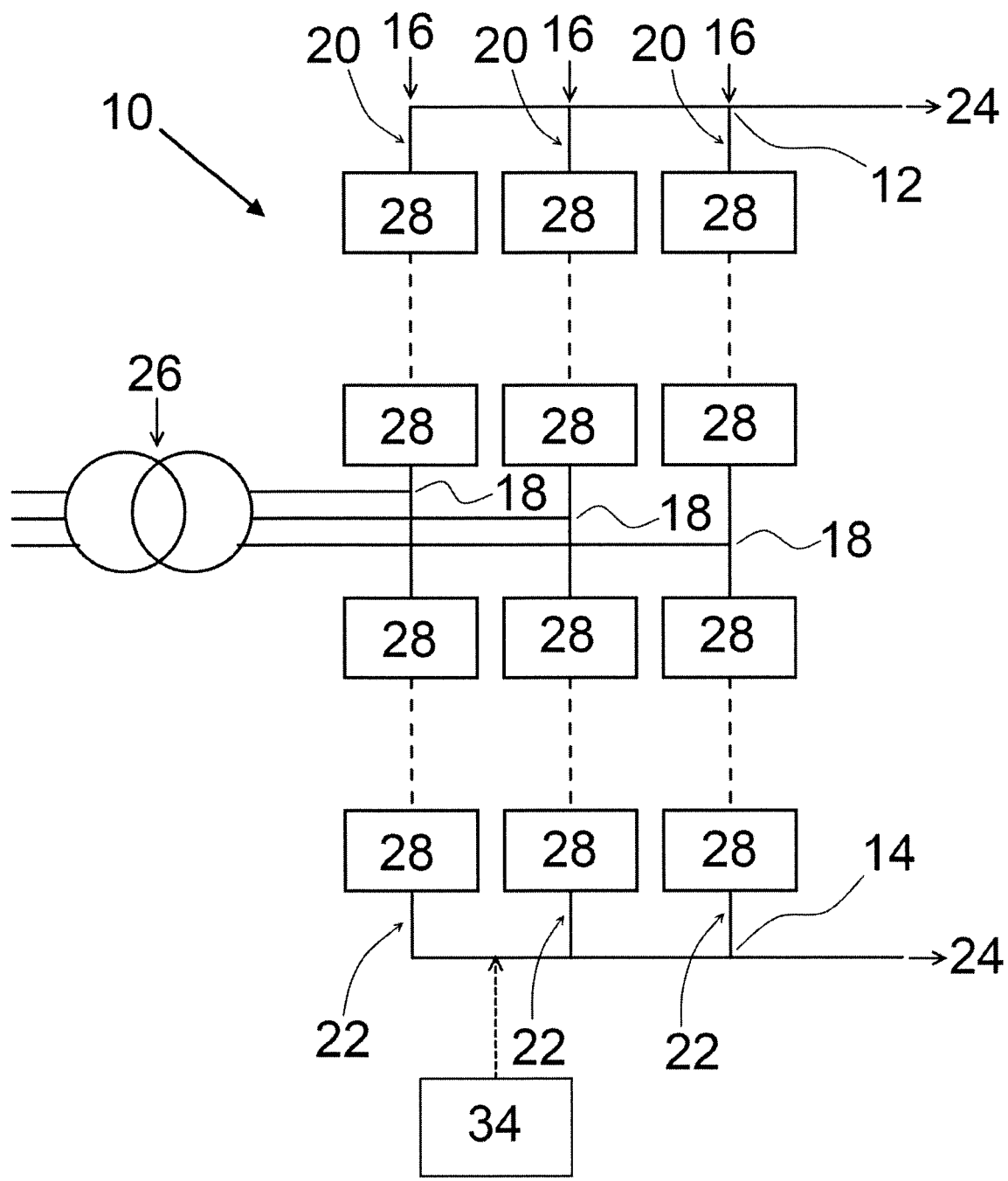
FIG. 1 shows, in schematic form, a modular power converter according to a first embodiment of the invention.

A modular power converter 10 according to a first embodiment of the invention is shown in FIG. 1.

The modular power converter 10 comprises first and second DC terminals 12,14, and a plurality of converter limbs 16.

Each converter limb 16 extends between the first and second DC terminals 12,14. Each converter limb 16 has first and second limb portions 20,22 separated by a respective AC terminal 18.

In use, the first and second DC terminals 12,14 are respectively connected to positive and negative poles of a DC electrical network 24, while each AC terminal 18 is connected to connected to a respective phase of a three-phase AC electrical network 26.

Figure 2:
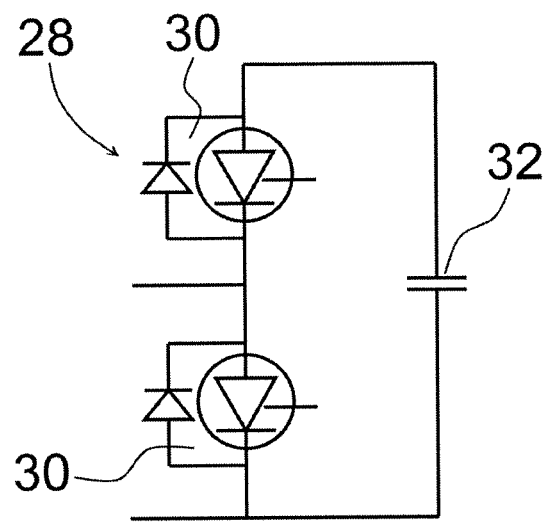
FIG. 2 shows, in schematic form, a structure of a 2-quadrant unipolar module.

Each limb portion 20,22 includes a plurality of series-connected modules 28. Each module 28 includes a pair of switching elements 30 and an energy storage device 32 in the form of a capacitor. The pair of switching elements 30 are connected in parallel with the capacitor 32 in a half-bridge arrangement, as shown in FIG. 2.

Each switching element 30 includes an active switching device that is connected in anti-parallel with a passive current check element.

Each active switching device is in the form of an insulated gate bipolar transistor (IGBT). It is envisaged that, in other embodiments of the invention, each IGBT may be replaced by a gate turn-off thyristor, a field effect transistor, an injection-enhanced gate transistor, an integrated gate commutated thyristor or any other self-commutated switching device. The number of active switching devices in each switching element 30 may vary depending on the required voltage rating of that switching element 30.

Each passive current check element includes a passive current check device in the form of a diode. It is envisaged that, in other embodiments, each diode may be replaced by any other device that is capable of limiting current flow in only one direction. The number of passive current check devices in each passive current check element may vary depending on the required voltage rating of that passive current check element.

It is envisaged that, in other embodiments of the invention, each capacitor may be replaced by another type of energy storage device that is capable of storing and releasing energy, e.g. a supercapacitor, an ultracapacitor, a battery or a fuel cell.

It is further envisaged that, in still other embodiments of the intention, at least one module may include a combination of different energy storage devices, such as the aforementioned types. The modular arrangement of the modular power converter 10 makes it straightforward to use different types or combinations of energy storage devices to vary the energy storage capacity of at least one module 28 to meet specific power requirements.

In each limb portion 20,22, the plurality of series-connected modules 28 defines a chain-link converter, and the operation of each module 28 in each chain-link converter is described as follows.

The capacitor 32 of the module 28 is selectively bypassed or inserted into the chain-link converter by changing the states of the IGBTs. This selectively directs current through the capacitor 32 or causes current to bypass the capacitor 32, so that the module 28 provides a zero or positive voltage.

The capacitor 32 of the module 28 is bypassed when the IGBTs are configured to form a short circuit in the module 28. This causes current in the chain-link converter to pass through the short circuit and bypass the capacitor 32, and so the module 28 provides a zero voltage, i.e. the module 28 is configured in a bypassed mode.

The capacitor 32 of the module 28 is inserted into the chain-link converter when the IGBTs are configured to allow the current in the chain-link converter to flow into and out of the capacitor 32. The capacitor 32 then charges or discharges its stored energy so as to provide a non-zero voltage, i.e. the module 28 is configured in a non-bypassed mode.

In this manner the IGBTs are connected in parallel with the capacitor 32 in a half-bridge arrangement to define a 2-quadrant unipolar module 28 that can provide zero or positive voltage and can conduct current in two directions, and so each module 28 is capable of selectively providing a voltage source.

It is possible to build up a combined voltage across the chain-link converter, which is higher than the voltage available from each of its individual modules 28 via the insertion of the capacitors of multiple modules 28, each providing its own voltage, into the chain-link converter. In this manner switching of the IGBTs in each module 28 causes the chain-link converter to provide a stepped variable voltage source, which permits the generation of a voltage waveform across the chain-link converter using a step-wise approximation. As such the chain-link converter is capable of providing a wide range of complex voltage waveforms.

It is envisaged that, in other embodiments of the invention, each module may be replaced by another type of module that includes at least one switching element and at least one energy storage device, the or each switching element and the or each energy storage device in the or each module combining to selectively provide a voltage source.

The modular power converter 10 further includes a control unit 34 configured to selectively switch the switching elements 30 in each module 28 of each limb portion 20,22 as follows.

Firstly, the control unit 34 is configured to selectively control switching of the switching elements 30 in each module 28 of each limb portion 20,22 to selectively provide a voltage source between the AC terminal 18 and the corresponding DC terminal 12,14 so as to transfer power between the DC terminals 12,14 and the AC terminal 18 and thereby transfer power between the AC and DC electrical networks 26,24.

Secondly, the control unit 34 is configured to selectively control switching of the switching elements 30 in each module 28 of each limb portion 20,22 to carry out modulation of power flow at one of the DC terminals 12,14 and the AC terminal 18.

Thirdly, the control unit 34 is configured to selectively control switching of the switching elements 30 in each module 28 of each limb portion 20,22 to store energy from or release energy to either or both of the DC terminals 12,14 and the AC terminal 18 so as to decouple the respective power flows at the DC terminals 12,14 and the AC terminal 18 (and therefore in the AC and DC electrical networks 26,24).

As mentioned earlier, a power oscillation may arise in the AC electrical network 26 as a result of undamped interaction between various power system components of the AC electrical network 26.

In event of a power oscillation in the AC electrical network 26, the control unit 34 controls switching of the switching elements 30 in each module 28 of each limb portion 20,22 to carry out modulation of power flow at the AC terminal 18 to damp the power oscillation in the AC electrical network 26. At the same time the control unit 34 controls switching of the switching elements 30 in each module 28 of each limb portion 20,22 to store energy from or release energy to either or both of the DC terminals 12,14 and the AC terminal 18 so as to decouple the respective power flows in the AC and DC electrical networks 26,24.

During operation of the modular power converter 10 to transfer power between the DC terminals 12,14 and the AC terminal 18, each capacitor 32 will have a mean DC voltage of, for example, 1.8 kV. The stored energy in a given capacitor 32 for a given voltage is calculated as follows:

$$Q = \tfrac{1}{2} \cdot CV^2$$

where Q is the stored energy of a given capacitor 32;
C is the capacitance of a given capacitor 32;
V is the voltage of a given capacitor 32.

Each module 28 is designed to utilise less than its maximum energy storage capacity during its control to enable the modular power converter 10 to transfer power between the AC and DC electrical networks 26,24. This means that any unused energy storage capacity of each module 28 is available for temporary energy storage during the operation of the modular power converter 10 to decouple the respective power flows in the AC and DC electrical networks 26,24. As such the voltage of each capacitor 32 can be varied during operation of the modular power converter 10. The variation in voltage represents a change in stored energy in a given capacitor 32, which is calculated as follows:

$$\Delta Q = \tfrac{1}{2} \cdot C(V_1^2 - V_2^2)$$

where $V_1$ and $V_2$ represent different voltages for a given capacitor 32.

For example, changing a voltage of a 7 mF capacitor from 1.8 kV to 2.0 kV changes the stored energy from 11.34 kJ to 14.00 kJ, i.e. a change in stored energy of 2660 J.

The extent of change of stored energy of the modular power converter 10 depends on the number of modules 28 in the modular power converter 10. For example, when the modular power converter 10 is a 1000 MW, 640 kV modular power converter with 2000 modules 28, the extent of change of stored energy of the modular power converter 10 is 5.32 MJ. Since each module 28 is capable of releasing energy into either or both of the DC terminals 12,14 and the AC terminal 18, the voltage on each capacitor 32 can temporarily fall below the mean voltage of 1.8 kV. Consequently the modular power converter 10 is capable of carrying out modulation of power flow over a range of ±5.32 MW at the AC terminal 18 while decoupling the respective power flows in the AC and DC electrical networks 26,24.

Each module 28 may include another energy storage device, such as an ultracapacitor, a supercapacitor or a battery, in addition to or in place of the capacitor 32 in each module so as to increase the range at which the modular power converter 10 is able to carry out modulation of power flow at the AC terminal 18 while decoupling the respective power flows in the AC and DC electrical networks 26,24.

Decoupling the respective power flows in the AC and DC electrical networks 26,24 enables the modular power converter 10 to inhibit the modulation of power flow at the AC terminal 18 from modifying a power flow at the DC terminals 12,14, thus preventing any undesirable change in power flow in the DC electrical network 24.

The ability to concurrently carry out modulation of power flow at the AC terminal 18 and decouple the respective power flows in the AC and DC electrical networks 26,24 enables synchronisation of the modulation of power flow at the AC terminal 18 and the decoupling of the respective power flows in the AC and DC electrical networks 26,24.

Since the functions of transferring power between the AC and DC electrical networks 26,24 and enabling decoupling of the respective power flows in the AC and DC electrical networks 26,24 both involve switching of the switching elements 30 in each module 28, there is not only no need to modify each module 28 to enable the modular power converter 10 to carry out both functions, but also such switching of the switching elements 30 in each module 28 to carry out both functions can be implemented within the same control unit 34, without requiring a significant addition of control hardware to accommodate both functions.

In contrast, omission of the control unit 34 from the modular power converter 10 means that it would be necessary to utilise a bulk energy storage system, which is separate from the modular power converter 10, to isolate an electrical network 24,26 from the effects of modulation of power flow. Use of a bulk energy storage system would not only add size, weight and cost to the associated electrical network 24,26, but also would have a number of other issues such as in-service operating losses, maintenance and reliability and availability considerations, thus resulting in a less efficient and less reliable alternative.

The configuration of the modular power converter 10 according to the invention therefore results in a cost-efficient and space-saving modular power converter 10 that is not only capable of transferring power between the AC and DC electrical networks 26,24 but also capable of selectively enabling decoupling of the respective power flows in the AC and DC electrical networks 26,24 so as to inhibit a modulation of power flow at one of the AC and DC electrical networks 26,24 from modifying a power flow at the other of the AC and DC electrical networks 26,24.

It will be appreciated that the control unit 34 may control the modular power converter 10 in a similar manner to that described above to decouple the respective power flows in the AC and DC electrical networks 26,24 so as to inhibit a modulation of power flow at the DC terminals 12,14 (and therefore in the DC electrical network 24) from modifying a power flow at the AC terminal 18 (and therefore in the AC electrical network 26).

It will be also appreciated that modulation of power flow at one of the DC terminals 12,14 and the AC terminal 18 may be carried out by another power converter or other power flow modulating hardware, and the control unit 34 may control the modular power converter 10 to decouple the respective power flows in the AC and DC electrical networks 26,24 so as to inhibit the modulation of power flow from modifying a power flow at the other of the DC terminals 12,14 and the AC terminal 18 when modulation of power flow at one of the DC terminals 12,14 and the AC terminal 18 is carried out by another power converter or other power flow modulating hardware.

Figure 3:
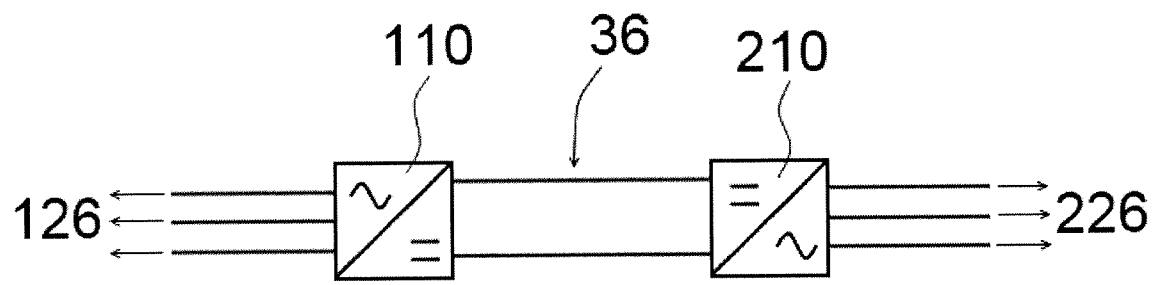
FIG. 3 shows, in schematic form, an electrical assembly according to a second embodiment of the invention.

An electrical assembly according to a second embodiment of the invention is shown in FIG. 3.

The electrical assembly includes first and second modular power converters 110,210. Each of the first and second power converters 110,210 is similar in structure and operation to the modular power converter 10 of FIG. 1, and like features share the same reference numerals.

In use, each AC terminal 18 of the first modular power converter 110 is connected to a respective phase of a first multi-phase AC electrical network 126, while each AC terminal 18 of the second modular power converter 210 is connected to a respective phase of a second multi-phase AC electrical network 226

The electrical assembly further includes a DC transmission link 36 to operatively interconnect the DC terminals 12,14 of the first and second modular power converters 110,210.

In event of a power oscillation in the first AC electrical network 126, the control unit 34 of the first power modular power converter 110 controls switching of the switching elements 30 in each module 28 of each limb portion 20,22 of the first power modular power converter 110 to carry out modulation of power flow at the corresponding AC terminals 18 to damp the power oscillation in the first AC electrical network 126. At the same time the control unit 34 of the first power modular power converter 110 controls switching of the switching elements 30 in each module 28 of each limb portion 20,22 of the first power modular power converter 110 to store energy from or release energy to either or both of the corresponding DC terminals 12,14 and the AC terminal 18 so as to decouple the respective power flows in the first AC electrical network 126 and the DC transmission link 36.

Decoupling the respective power flows in the first AC electrical network 126 and the DC transmission link 36 enables the first modular power converter 110 to inhibit the modulation of power flow at the AC terminals 18 from modifying a power flow in the DC transmission link 36, thus preventing any undesirable change in power flow in the DC transmission link 36.

If the degree of modulation required to damp the power oscillation in the first AC electrical network 126 is greater than the permitted change in stored energy in the first modular power converter 110, additional energy may be drawn by the first modular power converter 110 from the DC transmission link 36, which results in modulation of power flow in the DC transmission link 36. At the same time the control unit 34 of the second power modular power converter 210 controls switching of the switching elements 30 in each module 28 of each limb portion 20,22 of the second power modular power converter 210 to store energy from or release energy to either or both of the corresponding DC terminals 12,14 and the AC terminal 18 so as to decouple the respective power flows in the second AC electrical network 226 and the DC transmission link 36.

Decoupling the respective power flows in the second AC electrical network 226 and the DC transmission link 36 enables the second modular power converter 210 to inhibit the modulation of power flow in the DC transmission link 36 from modifying a power flow at the AC terminal 18 of the second modular power converter 210, thus preventing any undesirable change in power flow in the second AC electrical network 226.

Optionally the control unit 34 of the second modular power converter 210 may control switching of the switching elements 30 in each module 28 of each limb portion 20,22 of the second power modular power converter 210 to carry out modulation of power flow at the corresponding DC terminals 12,14 (and therefore in the DC transmission link 36), together with the first modular power converter 110, to damp the power oscillation in the first AC electrical network 126.

Configuring each of the first and second modular power converters to be similar in structure and operation to the modular power converter 10 of FIG. 1 results in a higher, combined energy storage capacity that allows a combined operation of the first and second modular power converters to decouple the respective power flows of the first and second AC electrical networks 126,226 over a wider range of modulation of power flow in comparison to the range of modulation of power flow over which each modular power converter 110,210 is individually capable of decoupling the respective power flows at the corresponding DC and AC terminals 12,14,18. Based on an exemplary extent of change of stored energy of each modular power converter 110,210 of 5.32 MJ, the available range of modulation of power flow for damping a power oscillation in one of the first and second AC electrical networks 126,226 without modifying a power flow in the other of the first and second AC electrical networks 126,226 is 10.64 MW.

Further optionally the control unit 34 of the second modular power converter 210 may control switching of the switching elements 30 in each module 28 of each limb portion 20,22 of the second power modular power converter 210 to carry out modulation of power flow at the corresponding DC terminals 12,14 (and therefore in the DC transmission link 36) to damp the power oscillation in the first AC electrical network 126, while the first modular power converter 110 is not operated to carry out modulation of power flow at the corresponding DC terminals 12,14 (and therefore in the DC transmission link 36) to damp the power oscillation in the first AC electrical network 126.

The above-described operation of the first and second modular power converters 110,210 apply mutatis mutandis to operation of the first and second modular power converters 110,210 to preventing any undesirable change in power flow in the DC transmission link 36 and/or in the first AC electrical network 126 in event of a power oscillation in the second AC electrical network 226.

It is envisaged that, in other embodiments of the invention, the electrical assembly may include first and second power converters, whereby only one of the first and second power converters is similar in structure and operation to the modular power converter 10 of FIG. 1.

In such embodiments, when only one of the first and second power converters is similar in structure and operation to the modular power converter of FIG. 1, the other power converter may include a control unit configured to selectively operate that other power converter to carry out modulation of power flow at one of the corresponding DC terminals and AC terminal. The control unit of the modular power converter may be configured to selectively control switching of the switching elements in each module of each limb portion to store energy from or release energy to either or both of the corresponding DC terminals and AC terminals so as to inhibit a modulation of power flow at the corresponding DC terminals from modifying a power flow at the corresponding AC terminal when the other power converter is operated to carry out modulation of power flow at one of the corresponding DC terminals and AC terminals. Such coordination between the modular power converter and the other power converter ensures that the modulation of power flow at one of the DC terminals and AC terminals of the other power converter is reliably inhibited from modifying a power flow at the AC terminal of the modular power converter.

Figure 4:
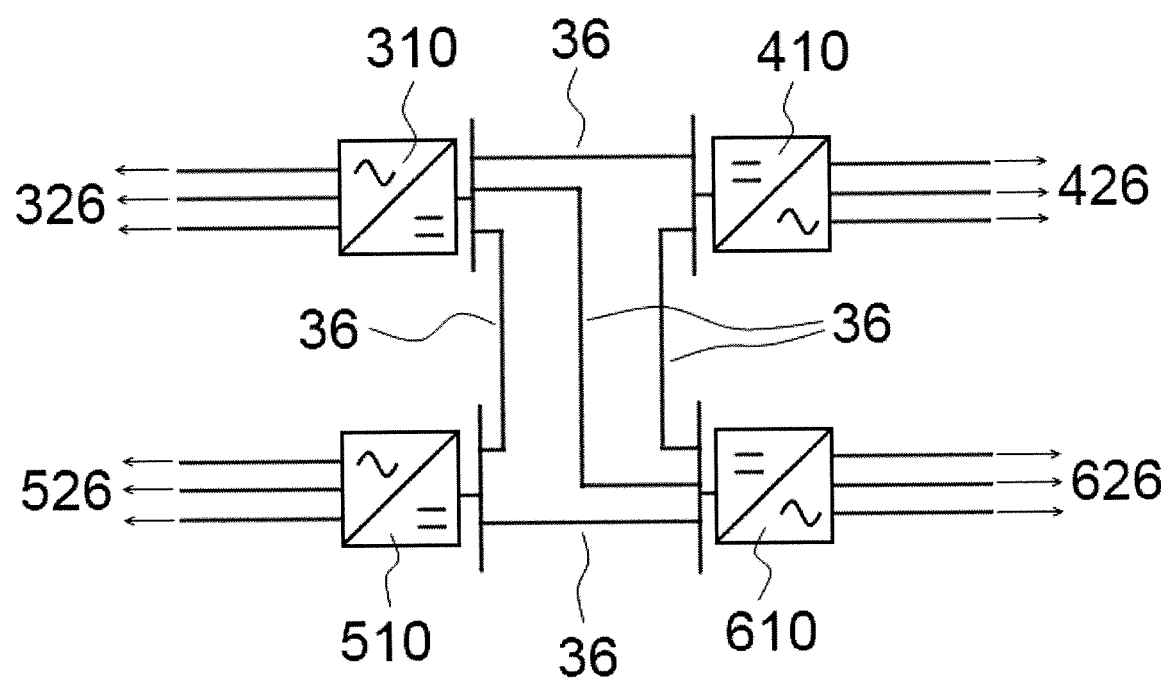
FIG. 4 shows, in schematic form, an electrical assembly according to a third embodiment of the invention.

An electrical assembly according to a third embodiment of the invention is shown in FIG. 4.

The electrical assembly includes a plurality of modular power converters 310,410,510,610. In the embodiment shown, the electrical assembly include three modular power converters 310,410,510,610. Each modular power converter 310,410,510,610 is similar in structure and operation to the modular power converter 10 of FIG. 1, and like features share the same reference numerals.

The electrical assembly further includes a plurality of transmission links 136. The DC terminals 12,14 of each modular power converter 310,410,510,610 is connected to the DC terminal 12,14 at least one other modular power converter 310,410,510,610 via a respective one of the plurality of transmission links 36.

In use, each AC terminal of each modular power converter 310,410,510,610 is connected to a respective phase of a respective multi-phase AC electrical network 326,426,526, 626.

In event of a power oscillation in one or more of the AC electrical networks 326,426,526,626, the control unit 34 of the corresponding power modular power converter 310,410, 510,610 controls switching of the switching elements 30 in each module 28 of each corresponding limb portion 20,22 to carry out modulation of power flow at the corresponding DC terminals 12,14 (and therefore in the corresponding DC transmission link or links 36) to damp the power oscillation in the or each relevant AC electrical network 326,426,526, 626. At the same time the control unit 34 of at least one other modular power converter 310,410,510,610 controls switching of the switching elements 30 in each module 28 of each corresponding limb portion 20,22 to store energy from or release energy to either or both of the corresponding DC terminals 12,14 and the AC terminal 18 so as to decouple the respective power flows in the corresponding AC electrical network 226 and the DC transmission link or links 36.

Optionally each control unit 34 of several or all of the modular power converters 310,410,510,610 may control switching of the switching elements 30 in each module 28 of each corresponding limb portion 20,22 to carry out modulation of power flow at the corresponding DC terminals 12,14 (and therefore in the DC transmission link or links 36) to damp the power oscillation in the or each relevant AC electrical network 326,426,526,626.

In a similar fashion to the second embodiment of the invention shown in FIG. 3, configuring each of the plurality of modular power converters 310,410,510,610 to be similar in structure and operation to the modular power converter 10 of FIG. 1 results in a higher, combined energy storage capacity that allows a combined operation at least two to all of the plurality of modular power converters 310,410,510, 610 to decouple the respective power flows of the respective AC electrical networks 326,426,526,626 over a wider range of modulation of power flow in comparison to the range of modulation of power flow over which each modular power converter 310,410,510,610 is individually capable of decoupling the respective power flows at the corresponding DC and AC terminals 12,14,18.

The inclusion of the modular power converters 310,410, 510,610 in the electrical assembly therefore makes it more straightforward to regulate power flow in the electrical assembly in response to a modulation of power flow, especially when the electrical assembly includes a complex interconnection of components that results in a complicated layout of power flows within the electrical assembly.

It is envisaged that, in other embodiments of the invention, the electrical assembly may include a plurality of power converters, whereby at least one, but not all, of the plurality of power converters is similar in structure and operation to the modular power converter 10 of FIG. 1.

In such embodiments, when at least one, but not all, of the plurality of power converters is similar in structure and operation to the modular power converter of FIG. 1, at least one other power converter, which is not similar in structure and operation to the modular power converter of FIG. 1, may include a control unit configured to selectively operate that other power converter to carry out modulation of power flow at one of the corresponding DC terminals and AC terminal. The control unit of the or each modular power converter may be configured to selectively control switching of the switching elements in each module of each corresponding limb portion to store energy from or release energy to either or both of the corresponding DC terminals and AC terminals so as to inhibit a modulation of power flow at the corresponding DC terminals from modifying a power flow at the corresponding AC terminal when the or each other power converter is operated to carry out modulation of power flow at one of the corresponding DC terminals and AC terminals. Such coordination between the or each modular power converter and the or each other power converter ensures that the modulation of power flow at one of the DC terminals and AC terminals of the other power converter is reliably inhibited from modifying a power flow at the AC terminal of the or each modular power converter.

Whilst each of the embodiments of FIGS. 1, 3 and 4 is primarily described with reference to the use of modulation of power flow to damp a power oscillation in an AC electrical network 26,126,226,336,426,526,626, it will be appreciated that the operation of the embodiments of FIGS. 1, 3 and 4 to decouple the respective power flows at the DC and AC terminals 12,14,18 of the or each modular power converter 10,110,210,310,410,510,610 may be carried out in respect of modulation of power flow for other purposes, such as optimising power flow quality.

It will be appreciated that the properties of each capacitor 32 and each modular power converter 10,110,210,310,410, 510,610 are merely chosen to help illustrate the operation of the invention, and may vary depending on the requirements of the associated power application.

It will be also appreciated that the topology of each modular power converter 10,110,210,310,410,510,610 and each electrical assembly is merely chosen to help illustrate the operation of the invention, and that each modular power converter 10,110,210,310,410,510,610 and each electrical assembly may be respectively replaced by another modular power converter with a different topology and another electrical assembly with a different topology.

It is envisaged that, in other embodiments of the invention, the terminals and modules of the modular power converter may be rearranged to configure the modular power converter as an AC-AC or DC-DC modular power converter.

The number of converter limbs in each modular power converter 10,110,210,310,410,510,610 may vary from depending on the number of phases in the respective AC electrical network 26,126,226,336,426,526,626 to which each modular power converter 10,110,210,310,410,510,610 is connected.

The invention claimed is:

1. A modular power converter comprising:
a first terminal for connection to an alternating current (AC) electrical network;
a second terminal for connection to a direct current (DC) electrical network;
at least one module connected between the first and second terminals, the or each module including at least one switching element and at least one energy storage device, the or each switching element and the or each energy storage device in the or each module combining to selectively provide a voltage source, the or each switching element in the or each module being switchable to transfer power between the first and second terminals; and
a control unit being configured to modulate a power oscillation from the first terminal or second terminal, and further being configured to, during modulation of the power oscillation, selectively control switching of the or each switching element in the or each module to store energy from or release energy to either or both of the first and second terminals so as to decouple respective power flows at the first and second terminals and thereby inhibit the modulation from modifying a power flow at the other of the first or second terminals;

wherein the control unit is operable to operate the or each switching element such that less than a maximum energy storage capacity of the or each energy storage device is used to transfer power between the first and second terminals;

wherein the control unit is operable to operate the or each switching element such that any unused energy storage capacity of the or each energy storage device is available for temporary energy storage to decouple respective power flows between the first and second terminals; and wherein modulation of the power flow at one of the first or second terminals includes damping of the power oscillation using energy from the or each energy storage device.

2. The modular power converter according to claim 1, wherein the control unit is configured to selectively control switching of the or each switching element in the or each module to concurrently:

carry out modulation of power flow at one of the first or second terminals; and store energy from or release energy to either or both of the first and second terminals so as to decouple respective power flows at the first and second terminals and thereby inhibit the modulation of power flow from modifying a power flow at the other of the first and second terminals.

3. The modular power converter according to claim 1 further comprising:

a pair of DC terminals connectable to a DC electrical network; and at least one converter limb extending between the pair of DC terminals and including first and second limb portions separated by an AC terminal, the AC terminal being connectable to an AC electrical network, each limb portion including at least one module, the or each switching element in each module being switchable to control the configuration of an AC voltage at the AC terminal and thereby transfer power between the AC and DC electrical networks, wherein the DC terminals define first terminals and the AC terminal defines the second terminal, or the DC terminals defines second terminals and the AC terminal define a first terminal.

4. The modular power converter according to claim 1 wherein the or each energy storage device is a capacitor, a supercapacitor, an ultracapacitor, a battery or a fuel cell.

5. An electrical assembly comprising:

a first modular power converter including a first terminal and a second terminal, one of the first and second terminals of the first power converter being connectable to a first alternating current (AC) electrical network;

a second modular power converter including a first terminal and a second terminal, one of the first or and second terminals of the second power converter being connectable to a second alternating current (AC) electrical network; and a direct current (DC) transmission link to operatively interconnect the other of the first and second terminals of the first power converter and the other of the first and second terminals of the second power converter;

wherein at least one of the first power converter or the second power converter comprises:

at least one module connected between the first and second terminals of the at least one of the first power converter or the second power converter, the or each module including at least one switching element and at least one energy storage device, the or each switching element and the or each energy storage device in the or each module combining to selectively provide a voltage source, the or each switching element in the or each module being switchable to transfer power between the first and second terminals of the at least one of the first power converter or the second power converter; and a control unit being configured to modulate a power oscillation from the first terminal or second terminal, and further being configured to, during modulation of the power oscillation, selectively control switching of the or each switching element in the or each module to store energy from or release energy to either or both of the first and second terminals so as to decouple respective power flows at the first and second terminals and thereby inhibit a modulation of power flow at one of the first and second terminals from modifying a power flow at the other of the first and second terminals;

wherein the control unit is operable to operate the or each switching element such that less than a maximum energy storage capacity of the or each energy storage device is used to transfer power between the first and second terminals;

wherein the control unit is operable to operate the or each switching element such that any unused energy storage capacity of the or each energy storage device is available for temporary energy storage to decouple respective power flows between the first and second terminals; and wherein modulation of a power flow at one of the first or second terminals of the at least one of the first power converter or the second power converter includes damping of the power oscillation using energy from the or each energy storage device.

6. The electrical assembly according to claim 5 wherein the control unit comprises a first control unit, the first power converter comprises the first control unit, the second power converter includes a second control unit configured to selectively operate the second power converter to carry out modulation of power flow at one of the corresponding first or second terminals, and the first control unit is configured to selectively control switching of the or each switching element in the or each corresponding module to store energy from or release energy to either or both of the corresponding first and second terminals so as to decouple respective power flows at the corresponding first and second terminals and thereby inhibit a modulation of power flow at one of the corresponding first or second terminals from modifying a power flow at the other of the corresponding first and second terminals when the second power converter is operated to carry out modulation of power flow at one of the corresponding first or second terminals.

7. The electrical assembly of claim 5, wherein the first modular power converter and the second modular power converter further comprise:

a pair of DC terminals connectable to a DC electrical network; and at least one converter limb extending between the pair of DC terminals and including first and second limb portions separated by an AC terminal, the AC terminal being connectable to an AC electrical network, each limb portion including at least one module, the or each switching element in each module being switchable to control the configuration of an AC voltage at the AC terminal and thereby transfer power between the AC and DC electrical networks, wherein the DC terminals define first terminals and the AC terminal defines the second terminal, or the DC terminals defines second terminals and the AC terminal define a first terminal.

8. The electrical assembly of claim 5, wherein the or each energy storage device is a capacitor, a supercapacitor, an ultracapacitor, a battery or a fuel cell.

9. The electrical assembly of claim 5, wherein the first modular power converter and the second modular power converter further comprise:

a pair of DC terminals connectable to a DC electrical network; and at least one converter limb extending between the pair of DC terminals and including first and second limb portions separated by an AC terminal, the AC terminal being connectable to an AC electrical network, each limb portion including at least one module, the or each switching element in each module being switchable to control the configuration of an AC voltage at the AC terminal and thereby transfer power between the AC and DC electrical networks, wherein the DC terminals define first terminals and the AC terminal defines the second terminal, or the DC terminals defines second terminals and the AC terminal define a first terminal.

10. An electrical assembly comprising:

a plurality of power converters each comprising a first terminal and a second terminal, a first one of the first or second terminals of each power converter being connectable to one of a plurality of alternating current (AC) electrical networks; and a plurality of direct current (DC) transmission links configured to interconnect a second one of the first or second terminals of the plurality of power converters to one another, wherein at least one of the plurality of power converters comprises:

at least one module connected between the first and second terminals of the at least one of the first power converter or the second power converter, the or each module including at least one switching element and at least one energy storage device, the or each switching element and the or each energy storage device in the or each module combining to selectively provide a voltage source, the or each switching element in the or each module being switchable to transfer power between the first and second terminals of the at least one of the first power converter or the second power converter; and a control unit being configured to modulate a power oscillation from the first terminal or second terminal, and further being configured to, during modulation of the power oscillation, selectively control switching of the or each switching element in the or each module to store energy from or release energy to either or both of the first and second terminals so as to decouple respective power flows at the first and second terminals and thereby inhibit a modulation of power flow at one of the first and second terminals from modifying a power flow at the other of the first and second terminals;

wherein the control unit is operable to operate the or each switching element such that less than a maximum energy storage capacity of the or each energy storage device is used to transfer power between the first and second terminals;

wherein the control unit is operable to operate the or each switching element such that any unused energy storage capacity of the or each energy storage device is available for temporary energy storage to decouple respective power flows between the first and second terminals; and wherein modulation of a power flow at one of the first or second terminals includes damping of the power oscillation using energy from the or each energy storage device.

11. The electrical assembly according to claim 10 wherein the control unit comprises a first control unit, a first power converter of the plurality of power converters comprises the first control unit, a second power converter of the plurality of power converters includes a second control unit configured to selectively operate the second power converter to carry out modulation of power flow at one of the corresponding first or second terminals, and the first control unit is configured to selectively control switching of the or each switching element in the or each corresponding module to store energy from or release energy to either or both of the corresponding first and second terminals so as to decouple respective power flows at the corresponding first and second terminals and thereby inhibit a modulation of power flow at one of the corresponding first or second terminals from modifying a power flow at the other of the corresponding first and second terminals when the second power converter is operated to carry out modulation of power flow at one of the corresponding first or second terminals.

12. The electrical assembly according to claim 10 wherein the control unit is configured to selectively control switching of the or each switching element in the or each module to concurrently:

carry out modulation of power flow at one of the first or second terminals of the at least one of the first power converter or the second power converter; and store energy from or release energy to either or both of the first and second terminals of the at least one of the first power converter or the second power converter so as to decouple respective power flows at the first and second terminals of the at least one of the first power converter or the second power converter and thereby inhibit the modulation of power flow from modifying a power flow at the other of the first and second terminals of the at least one of the first power converter or the second power converter.

13. The electrical assembly according to claim 10 wherein the control unit is configured to selectively control switching of the or each switching element in the or each module to carry out modulation of power flow at one of the first or second terminals.

14. The electrical assembly according to claim 10 wherein the or each energy storage device is a capacitor, a supercapacitor, an ultracapacitor, a battery or a fuel cell.

15. The electrical assembly according to claim 13 wherein the control unit is configured to selectively control switching of the or each switching element in the or each module to concurrently:

carry out modulation of power flow at one of the first or second terminals of the at least one power converter; and store energy from or release energy to either or both of the first and second terminals of the at least one power converter so as to decouple respective power flows at the first and second terminals of the at least one power converter and thereby inhibit the modulation of power flow from modifying a power flow at the other of the first and second terminals of the at least one power converter.

* * * * *